US010966269B2

(12) United States Patent
Keller et al.

(10) Patent No.: US 10,966,269 B2
(45) Date of Patent: Mar. 30, 2021

(54) SUPPORT OF CIRCUIT SWITCHED SERVICE IN A 5G CORE NETWORK

(71) Applicant: Telefonaktiebolaget LM Ericsson (publ), Stockholm (SE)

(72) Inventors: Ralf Keller, Würselen (DE); Peter Hedman, Helsingborg (SE); Ann-Christine Sander, Gothenburg (SE); Shabnam Sultana, Montreal (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 56 days.

(21) Appl. No.: 15/325,674

(22) PCT Filed: Dec. 21, 2016

(86) PCT No.: PCT/EP2016/082164
§ 371 (c)(1),
(2) Date: Jan. 11, 2017

(87) PCT Pub. No.: WO2018/113950
PCT Pub. Date: Jun. 28, 2018

(65) Prior Publication Data
US 2018/0227978 A1    Aug. 9, 2018

(51) Int. Cl.
*H04W 76/16*    (2018.01)
*H04W 36/00*    (2009.01)
(Continued)

(52) U.S. Cl.
CPC ......... *H04W 76/16* (2018.02); *H04L 65/4015* (2013.01); *H04W 4/14* (2013.01);
(Continued)

(58) Field of Classification Search
CPC . H04W 36/0022; H04W 48/18; H04W 60/04; H04W 36/12; H04W 36/0005;
(Continued)

(56) References Cited

U.S. PATENT DOCUMENTS

| 2013/0265938 A1* | 10/2013 | Jain | H04W 60/04 370/328 |
| 2015/0109966 A1* | 4/2015 | Hong | H04W 4/14 370/259 |

(Continued)

FOREIGN PATENT DOCUMENTS

WO    2015174806 A1    11/2015

OTHER PUBLICATIONS

3GPP, "3rd Generation Partnership Project; Technical Specification Group Core Network and Terminals; Diameter based protocols to support Short Message Service (SMS) capable Mobile Management Entities (MMEs) (Release 14)", 3GPP TS 29.338 V14.0.0, Dec. 2016, 1-50.

(Continued)

*Primary Examiner* — Oussama Roudani
(74) *Attorney, Agent, or Firm* — Murphy, Bilak & Homiller, PLLC

(57) ABSTRACT

There are provided mechanisms for supporting a Circuit Switched (CS) service in a 5G Core Network (5GCN). A method is performed by a wireless device. The method comprises registering with an Access and Mobility Management Function (AMF) of the 5GCN using Non-Access Stratum (NAS) signalling. The method comprises registering, with the 5GCN and using NAS signalling, for at least one CS service, wherein the registering for the at least one CS service is performed in conjunction with registering with the AMF.

23 Claims, 6 Drawing Sheets

(51) Int. Cl.
  *H04W 4/14* (2009.01)
  *H04L 29/06* (2006.01)
  *H04W 60/00* (2009.01)

(52) U.S. Cl.
  CPC ..... *H04W 36/0022* (2013.01); *H04L 65/1069* (2013.01); *H04W 60/005* (2013.01)

(58) Field of Classification Search
  CPC ... H04W 36/08; H04W 36/00; H04B 7/18541
  See application file for complete search history.

(56) References Cited

U.S. PATENT DOCUMENTS

| | | | | |
|---|---|---|---|---|
| 2017/0094570 | A1* | 3/2017 | Kim | H04W 36/08 |
| 2017/0099600 | A1* | 4/2017 | Jeong | H04W 8/02 |
| 2017/0290083 | A1* | 10/2017 | Tiwari | H04W 76/25 |
| 2017/0332192 | A1* | 11/2017 | Edge | H04W 64/00 |
| 2017/0332421 | A1* | 11/2017 | Sternberg | H04W 12/0609 |
| 2017/0366955 | A1* | 12/2017 | Edge | H04M 11/04 |
| 2018/0020418 | A1* | 1/2018 | Chandramouli | H04W 16/14 |
| 2018/0124854 | A1* | 5/2018 | Myhre | H04W 4/70 |
| 2018/0176854 | A1* | 6/2018 | Lau | H04L 51/04 |
| 2019/0150225 | A1* | 5/2019 | Mohamed | H04W 76/12 |
| | | | | 370/329 |
| 2019/0174003 | A1* | 6/2019 | Chandramouli | H04L 65/1016 |
| 2019/0191349 | A1* | 6/2019 | Kim | H04W 36/14 |

OTHER PUBLICATIONS

3GPP, "3rd Generation Partnership Project; Technical Specification Group Core Network and Terminals; Mobility Management Entity (MME)—Visitor Location Register (VLR) SGs interface specification (Release 13)", 3GPP TS 29.118 V13.5.0, Dec. 2016, 1-76.

3GPP, "3rd Generation Partnership Project; Technical Specification Group Services and System Aspects; Circuit Switched (CS) fallback in Evolved Packet System (EPS); Stage 2 (Release 13)", 3GPP TS 23.272 V13.4.0, Jun. 2016, 1-103.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 14)", 3GPP TS 23.401 V14.1.0, Sep. 2016, 1-379.

Unknown, Author, "RAT/EPS Fallback for IMS Multimedia calls", MediaTek Inc., SA WG2 Meeting #118, 52-166581, Reno, Nevada, USA, Nov. 14-18, 2016, 1-8.

Unknown, Author, "Support of IMS multimedia services in the NextGen System", Nokia, KDDI, SA WG2 Meeting #118, S2-166444, Reno, NV USA, Nov. 14-18, 2016, 1-2.

* cited by examiner

SUPPORT OF CIRCUIT SWITCHED SERVICE IN A 5G CORE NETWORK

TECHNICAL FIELD

Embodiments presented herein relate to a method, a wireless device, a 5G Core Network, a system, computer programs, and a computer program product for supporting a Circuit Switched service in a 5G Core Network.

BACKGROUND

In communications networks, there may be a challenge to obtain good performance and capacity for a given communications protocol, its parameters and the physical environment in which the communications network is deployed.

According to some envisioned scenarios both an evolved Long Term Evolution (eLTE) radio access network and a 5G radio access network (sometimes denoted New Radio) will be connected to a 5G Core Network (5GCN). The eLTE radio access network may also be connected to an evolved packet Core (EPC) network partly to serve legacy wireless devices but also wireless devices utilizing scenarios where the 5G radio access network is anchored in the EPC/LTE.

According to some envisioned scenarios the 5GCN will not deal with interworking with legacy (2G and 3G) radio access networks. There could be deployments with both 5GCN and EPC and LTE connected to 5GCN and LTE connected to EPC.

For example, one parameter in providing good performance and capacity for a given communications protocol in a communications network is the availability of circuit switched (CS) services.

In some envisioned scenarios it is not foreseen to support CS services, such as Circuit Switched FallBack (CSFB) for voice and Short Message Service (SMS) for messages, in 5GCN deployments. As an example, in order to provide voice, it would require overlapping network coverage between 5G and 4G for full and perfect VoLTE coverage, which may not be possible to achieve in all deployments. It also requires that all network operators that want to use eLTE, NR and 5GCN must use VoLTE as the only option for operator provided voice services.

Hence, there is a need for an improved handling of CS services in 5G communications networks.

SUMMARY

A general object of embodiments herein is to provide efficient handling of CS services in 5G communications networks.

A first object of embodiments herein is to provide a method for efficient handling of CS services in 5G communications networks as performed by a wireless device.

According to a first aspect there is presented a method for supporting a Circuit Switched (CS) service in a 5G Core Network (5GCN). The method is performed by a wireless device. The method comprises registering with an Access and Mobility Management Function (AMF) of the 5GCN using Non-Access Stratum (NAS) signalling. The method comprises registering, with the 5GCN and using NAS signalling, for at least one CS service, wherein the registering for the at least one CS service is performed in conjunction with registering with the AMF.

A second object of embodiments herein is to provide a wireless device for efficient handling of CS services in 5G communications networks.

According to a second aspect there is presented a wireless device for supporting a CS service in a 5GCN. The wireless device comprises processing circuitry. The processing circuitry is configured to cause the wireless device to register with an AMF of the 5GCN using NAS signalling. The processing circuitry is configured to cause the wireless device to register, with the 5GCN and using NAS signalling, for at least one CS service, wherein the registering for the at least one CS service is performed in conjunction with registering with the AMF.

According to a third aspect there is presented a wireless device for supporting a CS service in a 5GCN. The wireless device comprises processing circuitry and a storage medium. The storage medium stores instructions that, when executed by the processing circuitry, cause the wireless device to perform operations, or steps. The operations, or steps, cause the wireless device to register with an AMF of the 5GCN using NAS signalling. The operation, or steps, cause the wireless device to register, with the 5GCN and using NAS signalling, for at least one CS service, wherein the registering for the at least one CS service is performed in conjunction with registering with the AMF.

According to a fourth aspect there is presented a wireless device for supporting a CS service in a 5GCN. The wireless device comprises a register module configured to register with an AMF of the 5GCN using NAS signalling. The wireless device comprises a register module configured to register, with the 5GCN and using NAS signalling, for at least one CS service, wherein the registering for the at least one CS service is performed in conjunction with registering with the AMF.

According to a fifth aspect there is presented a computer program for supporting a CS service in a 5GCN, the computer program comprising computer program code which, when run on processing circuitry of a wireless device, causes the wireless device to perform a method according to the first aspect.

A third object of embodiments herein is to provide a method for efficient handling of CS services in 5G communications networks as performed in a 5GCN.

According to a sixth aspect there is presented a method for supporting a supporting a CS service in a 5GCN. The method is performed in the 5GCN. The method comprises registering a wireless device with an AMF of the 5GCN using NAS signalling. The method comprises registering the wireless device for at least one CS service with the 5GCN using NAS signalling in conjunction with registering the wireless device with the AMF.

A fourth object of embodiments herein is to provide a 5GCN for efficient handling of CS services in 5G communications networks.

According to a seventh aspect there is presented a 5GCN for supporting a CS, service in the 5GCN. The 5GCN comprises processing circuitry. The processing circuitry is configured to cause the 5GCN to register a wireless device with an AMF of the 5GCN using NAS signalling. The processing circuitry is configured to cause the 5GCN to register the wireless device for at least one CS service with the 5GCN using NAS signalling in conjunction with registering the wireless device with the AMF.

According to an eighth aspect there is presented a 5GCN for supporting a CS, service in the 5GCN. The 5GCN comprises processing circuitry and a storage medium. The storage medium stores instructions that, when executed by the processing circuitry, cause the 5GCN to perform operations, or steps. The operations, or steps, cause the 5GCN to register a wireless device with an AMF of the 5GCN using NAS signalling. The operations, or steps, cause the 5GCN to register the wireless device for at least one CS service with the 5GCN using NAS signalling in conjunction with registering the wireless device with the AMF.

According to a ninth aspect there is presented a 5GCN for supporting a CS, service in the 5GCN. The 5GCN comprises a register module configured to register a wireless device with an AMF of the 5GCN using NAS signalling. The 5GCN comprises a register module configured to register the wireless device for at least one CS service with the 5GCN using NAS signalling in conjunction with registering the wireless device with the AMF.

According to a tenth aspect there is presented a computer program for supporting a CS service in a 5GCN, the computer program comprising computer program code which, when run on processing circuitry in the 5GCN, causes the 5GCN to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

According to a twelfth aspect there is presented a system for supporting a CS service in a 5GCN. The system comprises a wireless device and the 5GCN. The wireless device and the 5GCN are configured to register a wireless device with an AMF of the 5GCN using NAS signalling. The wireless device and the 5GCN are configured to register the wireless device for at least one CS service with the 5GCN using NAS signalling in conjunction with registering the wireless device with the AMF.

Advantageously these methods, this wireless device, this 5GCN, these computer programs, and this system provide efficient and flexible handling of CS services in a 5G communications network. The handling is flexible in the sense that the provided functionality for supporting the CS service in the 5GCN can be added per subscriber, and hence the functionality does not need to be supported by a dedicated node in a particular area.

Advantageously these methods, this wireless device, this 5GCN, these computer programs, and this system relieve the need to support VoLTE in 5GCN for all wireless devices served by the 5GCN.

Advantageously these methods, this wireless device, this 5GCN, these computer programs, and this system enable the CS domain to be used for voice and SMS also in a 5G communications system.

It is to be noted that any feature of the first, second, third, fourth, fifth, sixth seventh, eight, ninth, tenth, eleventh and twelfth aspects may be applied to any other aspect, wherever appropriate. Likewise, any advantage of the first aspect may equally apply to the second, third, fourth, fifth, sixth, seventh, eight, ninth, tenth, eleventh, and/or twelfth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or to feature illustrated by dashed lines should be regarded as optional.

Figure 1:
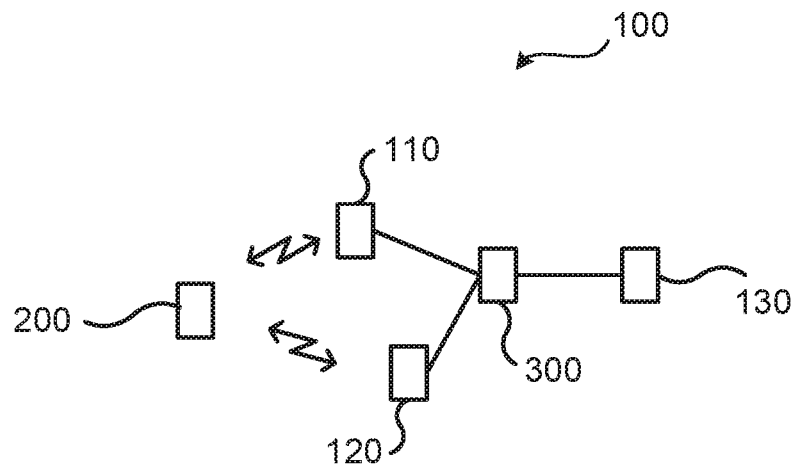
FIGS. 1, 2, 3, and 4 are schematic diagram illustrating communication networks according to embodiments.

FIG. 1 is a schematic diagram illustrating a communications network 100 where embodiments presented herein can be applied. The communications network 100 comprises a 5G Core Network (5GCN) 300 interconnected between a wide area network (such as an Internet Protocol (IP) services network) 130 and radio access network nodes 110, 120 (such as an eLTE eNB radio access network node 110 and a 5G gNB radio access network node 120). In some aspects the functionality of an LTE eNB, an eLTE eNB, and a 5G gNB is provided in one and the same radio access network node 110, 120.

A wireless device 200 having a wireless connection to one of the radio access network nodes 110, 120 is thereby enabled to access services, and exchange data with, the wide area network 130.

Figure 2:
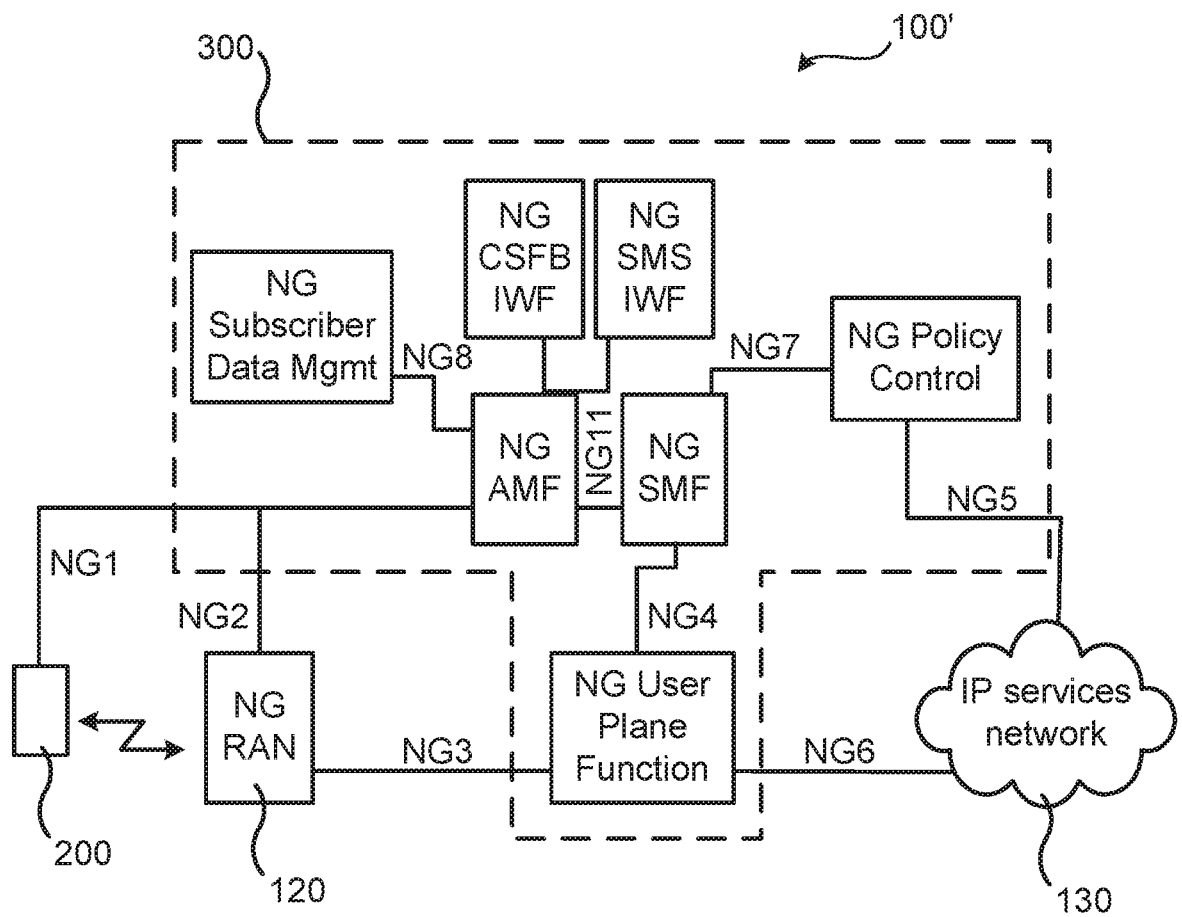

FIG. 2 is a schematic diagram illustrating a communications network 100' where embodiments presented herein can be applied. The communications network 100' shows part of the communications network 100 where the LTE/eLTE eNB radio access network node 110 has been omitted. FIG. 2 further illustrates entities of the 5GCN 300, including example network interfaces NG1, NG2, NG3, NG4, NG5, NG6, NG8, GNG 11. The 5GCN 300 thus comprises an NG Subscriber Data Management function, a NG User Plane Function, an NG Policy Control function, a NG Access and Mobility Management Function (AMF), an NG Session Management function (SMF), an NG CSFB Inter Working Function (IWF), and an NG SMS IWF.

Figure 3:
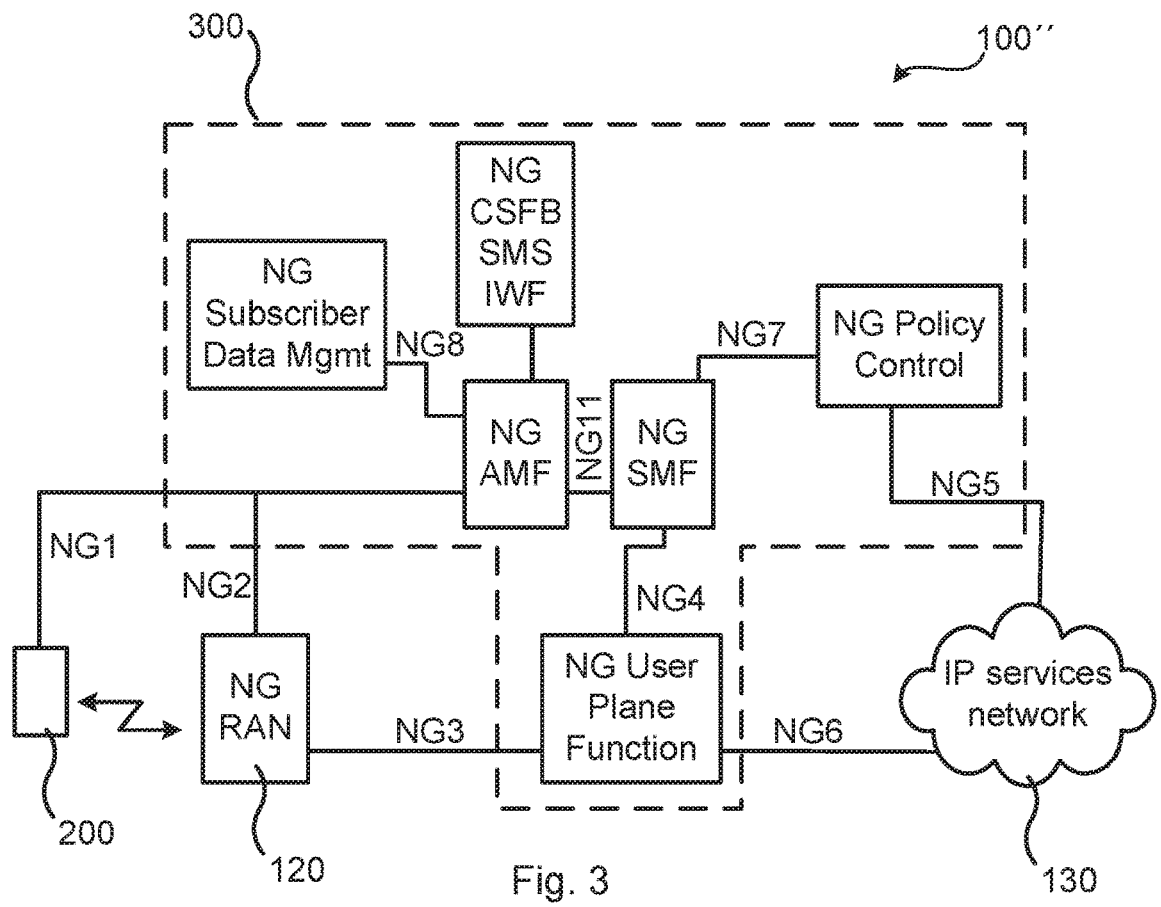

FIG. 3 is a schematic diagram illustrating a communications network 100" where embodiments presented herein can be applied. The communications network 100" is similar to the communications network 100' but with a difference that the NG CSFB IWF and the NG SMS IWF are collocated.

Without loss of generality the NG CSFB IWF and the NG SMS IWF may either be provided as separate functions (as in FIG. 2) or be collocated in a common function (as in FIG. 3). In the following individual functions (CSFB IWF and SMS IWF) will be assumed, although the herein disclosed embodiments are equally applicable to both variations.

Figure 4:
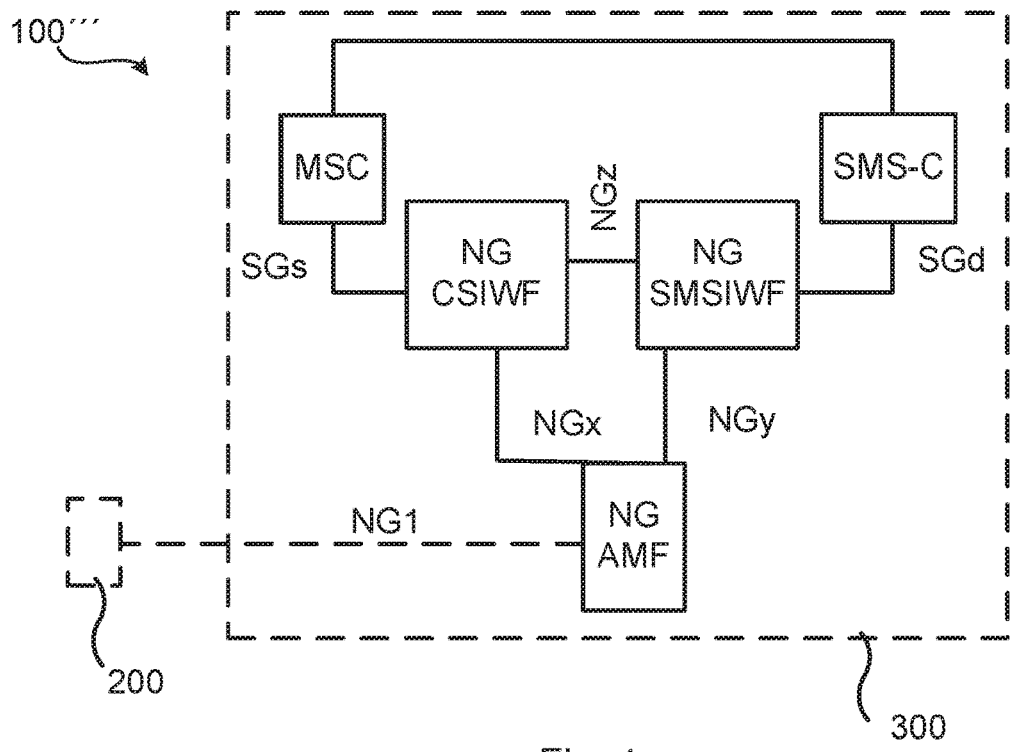

FIG. 4 is a schematic diagram illustrating a communications network 100''' where embodiments presented herein can be applied. The communications network 100''' is similar to the communications network 100' but with a difference that also a Mobile Switching Center (MSC) function and an SMS center (SMS-C) and respective interfaces NG1, NGx, NGy, NGz, SGs and SGd are illustrated. Interfaces SGs and SGd are defined in 3GPP TS 23.272 "Circuit Switched (CS) fallback in Evolved Packet System (EPS); Stage 2", in 3GPP TS 29.118 "Mobility Management Entity (MME)—Visitor Location Register (VLR) SGs interface specification", and in 3GPP TS 29.338 "Diameter based protocols to support Short Message Service (SMS) capable Mobile Management Entities (MMEs)", however, may carry 5G related enhancements. NGx, Ngy, NGz can be internal interfaces if the CSFB IWF, the SMS IWF, and the AMF are implemented in one single node or Network Function.

The embodiments disclosed herein thus relate to mechanisms for supporting a CS service in a 5GCN 300. This implies changing of network configuration, such as change of radio access technology, for the wireless device 200 to be able to use the CS service. The CS service could be a CSFB voice service or a messaging service, such as SMS. In order to obtain mechanisms for supporting a CS service in a 5GCN 300 there is provided a wireless device 200, a method performed by the wireless device 200, a computer program product comprising code, for example in the form of a computer program, that when run on processing circuitry of the wireless device 200, causes the wireless device 200 to perform the method. In order to obtain such mechanisms there is further provided a 5GCN, a method performed in the 5GCN, and a computer program product comprising code, for example in the form of a computer program, that when run on processing circuitry in the 5GCN, causes the 5GCN to perform the method.

Figure 5:
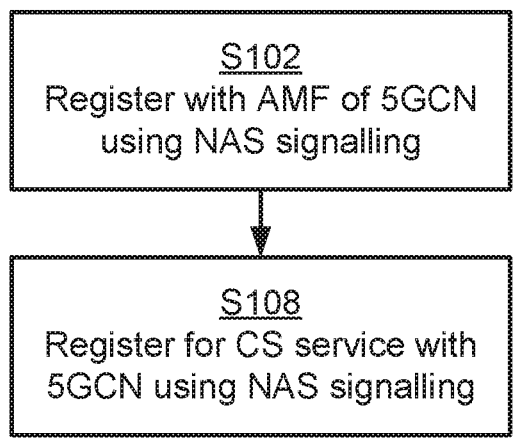
FIGS. 5, 6, 7, and 8 are flowcharts of methods according to embodiments.
Figure 6:
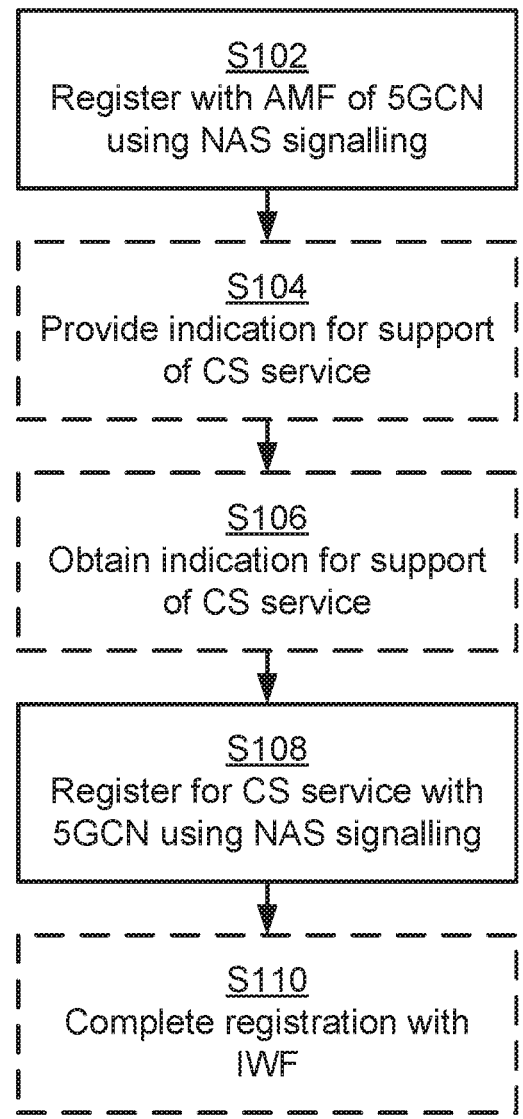
Figure 7:
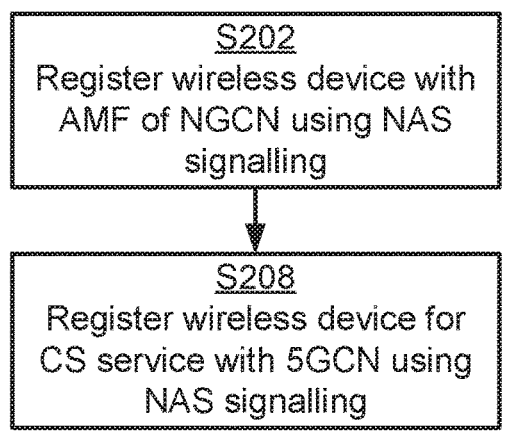
Figure 8:
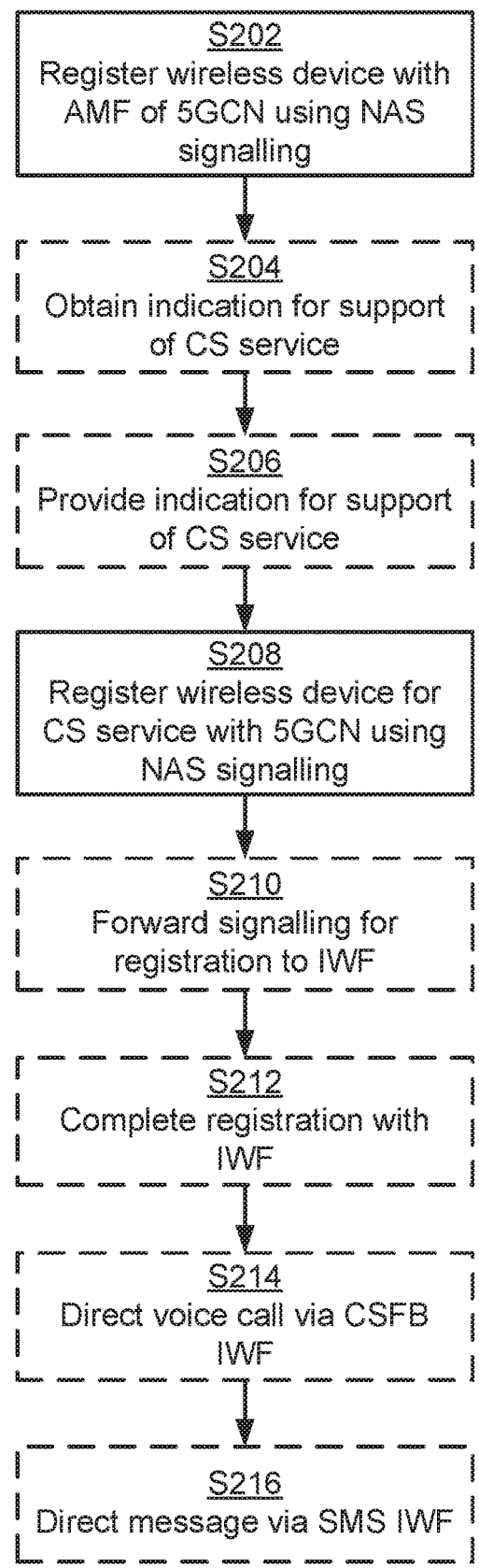

FIGS. 5 and 6 are flow charts illustrating embodiments of methods for supporting a CS service in a 5GCN 300 as performed by the wireless device 200. FIGS. 7 and 8 are flow charts illustrating embodiments of methods for supporting a CS service in a 5GCN 300 as performed in the 5GCN. The methods are advantageously provided as computer programs 1420a, 1420b.

Reference is now made to FIG. 5 illustrating a method for supporting a CS service in a 5GCN 300 as performed by the wireless device 200 according to an embodiment.

S102: The wireless device 200 registers with the AMF of the 5GCN 300 using NAS signalling.

S108: The wireless device 200 registers with the 5GCN 300 and using NAS signalling, for at least one CS service, wherein the registering for the at least one CS service is performed in conjunction with registering with the AMF.

Embodiments relating to further details of supporting a CS service in a 5GCN 300 as performed by the wireless device 200 will now be disclosed.

Reference is now made to FIG. 6 illustrating methods for supporting a CS service in a 5GCN 300 as performed by the wireless device 200 according to further embodiments. It is assumed that steps S102, S108 are performed as described above with reference to FIG. 5 and a thus repeated description thereof is therefore omitted.

In some aspects the wireless device 200 indicates to the 5GCN 300 that it wishes to have support for the CS service. Hence, according to an embodiment the wireless device 200 is configured to perform step S104 as part of registering with the AMF:

S104: The wireless device 200 provides an indication to the AMF for support of the at least one CS service.

In general terms, to save signalling, the wireless device 200 may send such an indication in the first registration message (as in step S102) as a piggy-backed container, or similar.

Alternatively or additionally, in some aspects the 5GCN 300 indicates to the wireless device 200 that the 5GCN 300 enables, or supports, the CS service. Hence, according to an embodiment the wireless device 200 is configured to perform step S106:

S106: The wireless device 200 obtains, from the AMF, an indication that the AMF enables the at least one CS service.

Step 106 could be performed as part of the registration with the AMF.

In some aspects the registration for the CS service is completed with an IFW of the 5GCN 300. Hence, according to an embodiment the wireless device 200 is configured to perform step S110:

S110: The wireless device 200 completes registration with the at least one CS service with an IWF of the 5GCN 300.

As an alternative, the registration for the CS service may be under AMF responsibility and network configuration made agnostic to the wireless device 200. The wireless device 200 would then register to the AMF and register for at least one CS service independently of whether the at least one CS service is handled by the AMF or any combination of IWFs for CS services. The IWF may therefore be dependent on network configuration residing in a separate Network Function or a Network Function embedded in, or collocated with, the AMF.

Reference is now made to FIG. 7 illustrating a method supporting a CS service in a 5GCN 300 as performed in the 5GCN 300 according to an embodiment.

S202: The wireless device 200 is registered with an AMF of the 5GCN 300 using NAS signalling.

S208: The wireless device 200 is registered for at least one CS service with the 5GCN 300 using NAS signalling in conjunction with the wireless device 200 being registered with the AMF.

Embodiments relating to further details of supporting a CS service in a 5GCN 300 as performed in the 5GCN 300 will now be disclosed.

Reference is now made to FIG. 8 illustrating methods for supporting a CS service in a 5GCN 300 as performed in the 5GCN 300 according to further embodiments. It is assumed that steps S202, S208 are performed as described above with reference to FIG. 7 and a thus repeated description thereof is therefore omitted.

As disclosed above, in an embodiment the wireless device 200 provides an indication to the AMF for support of the at least one CS service. Hence, according to an embodiment the 5GCN 300 is configured to perform step S204 as part of the registration with the AMF:

S204: An indication is obtained from the wireless device 200 for support of the at least one CS service.

As disclosed above, in an embodiment the wireless device 200 obtains an indication that the AMF enables the at least one CS service. Hence, according to an embodiment the 5GCN 300 is configured to perform step S206:

S206: An indication is provided from the AMF and to the wireless device 200 that the AMF enables the at least one CS service.

Step S208 could be performed as part of the registration of the wireless device 200 with the AMF.

As disclosed above, in an embodiment the wireless device 200 completes registration with the at least one CS service with an IWF of the 5GCN 300. Hence, according to an embodiment the 5GCN 300 is configured to perform step S212:

S212: Registration of the wireless device 200 with the at least one CS service is completed with an IWF of the 5GCN 300.

In some aspects the AMF forwards the registration of the wireless device 200 with the at least one CS service to the IFW of the CS service. Hence, according to an embodiment the 5GCN 300 is configured to perform step S210:

S210: Signalling for registering the at least one CS service is forwarded from the AMF to the IWF.

Step S210 could involve the AMF to split CSFB related NAS signaling from other NAS signaling and to forward the CSFB related NAS signaling to the CSFB IWF. Step S210 could additionally or alternatively involve the AMF to split SMS related NAS signaling from other NAS signaling and to forward the SMS related NAS signaling to the SMS IWF. As disclosed above, the CSFB IWF and the SMS IWF could be collocated and hence the AMF could split CS service related NAS signaling from other NAS signaling and to forward the CS service related NAS signaling to the IWF for the CS services. Step S210 could additionally or alternatively involve the AMF to forward the CSFB and SMS related NAS signalling to separate processing entities or functions inside the AMF.

Step S210 could be performed before, or in conjunction with, step S212.

In some aspects, voice calls are directed via the CSFB IWF. Hence, according to an embodiment the 5GCN 300 is configured to perform step S214:

S214: Indication of establishment of a voice call of a voice service for the wireless device 200 is directed via the CSFB IWF.

In further aspects, originated/terminated calls could be handled like originated/terminated calls in 4G as specified in 3GPP TS 23.272, with the following differences. Signalling for terminating call is indicated via SGs to the CSFB IWF to the AMF and from there to the wireless device 200 (via eNB or gNB). Originated calls are indicated from the wireless device 200 to the AMF and from there to the CSFB IWF, possibly with interaction with the MSC as described in 3GPP TS 23.272. The wireless device 200 will return to 5G coverage (eLTE or NR) after the call is completed in the similar way as returning to LTE after CSFB in EPC/LTE. It is possible to allow the wireless device 200 to send/receive data during the call in 2G/3G in a similar way as for existing CSFB in EPC/LTE. This is achieved by letting the 5GCN 300 connect to Gn-SGSN or SGW in EPC/LTE over interface Gn or S5. This requires that the wireless device 200 interacts with Gn-SGSN by performing a Routing Area Update (RAU) or an Inter-Radio Access Technology (IRAT) handover (like for CSFB in EPC/LTE).

In some aspects, messages of a messaging service, such as SMS, is directed via the SMS IWF. Hence, according to an embodiment the 5GCN 300 is configured to perform step S216:

S216: A message of a messaging service for the wireless device 200 is directed via the SMS IWF.

In further aspects, sending/receiving of SMS are performed whilst the wireless device 200 camps on eLTE/NR like sending/receiving of SMS in 4G as described in 3GPP TS 23.272, with the following differences. The SMS is carried via NAS signalling between wireless device 200 and the AMF, and sent/received either via the SMS IWF and interface SGs, via the combined CSFB IWF and SMS IWF via interface SGs, or via the CSFB IWF via interface SGs.

In some aspects, availability, or usage, of the CSFB IWF and the SMS IWF is either dependent on or independent from which network slices the wireless device 200 requests to use. Hence, according to an embodiment the 5GCN 300 is configured for network slicing, and availability and/or usage of the CSFB IWF and the SMS IWF is either dependent on or independent from which network slices that the wireless device 200 requests to use. In more details, the CSFB IWF and the SMS IWF could be regarded as slice independent in the sense that the same CSFB IWF/SMS IWF can be selected even if different network slices are being used since the AMF is common for all network slices for one wireless device 200. The wireless device 200 may register only once in the CSFB IWF/SMS IWF even when using multiple network slices. Any additional registration attempt would be rejected either by AMF or by CSFB IWF/SMS IWF. As an option, the availability or usage of the CSFB IWF and the SMS IWF could be dependent on the network slices the wireless device 200 wants to use, e.g. if the wireless device 200 requests to use a network slice for enhanced Mobile Broadband (eMBB) then the AMF (selected among possible available AMFs) is selected, which makes CSFB IWF and SMS IWF available, whereas if the wireless device 200 requests to use a network slice for an Internet of Things (IoT) service the selected AMF may reject registration attempts for CSFB. As a yet further option, the availability of any CS service is independent from which network slices are used by the wireless device 200.

Further embodiments applicable to both the methods performed by the wireless device 200 and the methods performed in the 5GCN 300 will now be disclosed.

The wireless device 200 may register for at least two CS services in the same NAS signaling. Particularly, according to an embodiment a common registering is performed for all of the CS services. Alternatively, according to another embodiment a separate registering is performed for each of the CS services.

As disclosed above, the registering for the at least one CS service (in steps S108, S208) is performed in conjunction with registering with the AMF (in steps S102, S202). In some aspects the registering for the at least one CS service is performed in parallel with the registration with the AMF (possibly even using the same NAS signalling). This may allow for a quick registration for the at least one CS service. In other aspects the registering for the at least one CS service is performed upon successful registration with the AMF. This may avoid unnecessary registration for the at least one CS service if the registering for the at least one CS service is unsuccessful.

Further, there may different points of time when the registering with the AMF is performed (in steps S102, S202). In some aspects the registering with the AMF is performed during initial network attachment of the wireless device 200. In other aspects the registering with the AMF is performed during re-attachment of the wireless device 200 to the 5GCN 300.

In this respect, attachment to the MSC could require successful registration to the AMF, but attachment to the MSC may fail whilst the registration to the AMF can be kept. The wireless device 200 could be informed about successful/failed attach to the MSC (or successful/failed registration to the CS service).

If the AMF is changed, the wireless device 200 in some aspects needs to perform a new registration for the CS service. For example, there may be a need to select a new CSFB IWF and/or new SMS IWF. Alternative, the old AMF may inform the new AMF about whether the wireless device 200 requires a CS service, and at any time the wireless device 300 may be informed about a change of available CS services.

If the CSFB IWF is invoked for "SMS only", the CSFB IWF decides whether SGs or SMS IWF is to be used. Alternatively, the AMF decides whether to invoke the CSFB IWF or only the SMS IWF.

One particular embodiment for supporting a CS service in a 5GCN 300 based on at least some of the above disclosed embodiments will now be disclosed in detail.

S301: The wireless device (WD) 200 performs registration into the 5GCN 300 towards the AMF using NAS signalling. One way to implement step S301 is to perform any of step S102 and step S202.

S302: The AMF optionally indicates during the registration whether it enables, or supports, at least one CS service. One way to implement step S302 is to perform any of step S106 and step S206.

S303: The wireless device 200 registers with the 5GCN 300 for CSFB using NAS signalling. This NAS signalling may be also part of step S301 or any time later. One way to implement step S303 is to perform any of step S108 and step S208.

S304: The AMF splits the CSFB related NAS signaling from other NAS signaling and forwards the CSFB related NAS signaling to the CSFB IWF. The CSFB IWF may then follow procedures as described in above mentioned 3GPP TS 23.272, section 5.2.

S305: Complete registration to the CSFB IWF is performed. Additional interactions with MSC are not shown. One way to implement step S305 is to perform any of step S110 and step S210.

S306: The wireless device registers with the 5GCN 300 for SMS using NAS signalling. This NAS signaling may be also part of step S301 or any time later. One way to implement step S306 is to perform any of step S108 and step S208.

S307: The AMF splits the SMS related NAS signaling from other NAS signaling and forwards the SMS related NAS signaling to the SMS IWF. The SMS IWF may then follow procedures as described in above mentioned 3GPP TS 23.272, section 5.2. However, If using SGd, then no such procedure needs to be used.

S308: Complete registration to the SMS IWF is performed. Additional interactions with SMS-C, if any, are not shown. One way to implement step S308 is to perform any of step S110 and step S210.

In summary, the wireless device 200, if registering via either the gNB supporting NR or the eNB supporting eLTE, will use NAS signalling to register in the 5GCN 300. Once this registration is successful, or in parallel to the registration, the wireless device 200 uses NAS signalling to perform registration oofr at least one CS service, such as for CSFB for voice, SMS or both. The AMF splits the CS (CSFB and/or SMS) related NAS signaling from the other NAS signaling and routes it to the IWF (CSFB IWF and/or SMS IWF). Signaling from the CSFB IWF and/or SMS IWF is merged into the NAS to the wireless device 200. The CSFB IWF interacts with the MSC for voice related signaling (SGs) and the SMS IWF interacts with the SMS-C for SMS related signaling (SGd). For SMS related signaling, the CSFB IWF may either interact with the MSC or with the SMS IWF. The CSFB IWF and the SMS IWF may be collocated in a single IWF.

Figure 10:
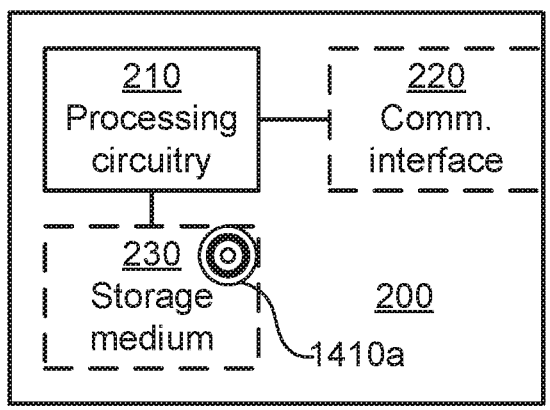
FIG. 10 is a schematic diagram showing functional units of a wireless device according to an embodiment.

FIG. 10 to schematically illustrates, in terms of a number of functional units, the components of a wireless device according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1410a (as in FIG. 14), e.g. in the form of a storage medium 230. The processing circuitry 210 may further be provided as at least one application specific integrated circuit (ASIC), or field programmable gate array (FPGA).

Particularly, the processing circuitry 210 is configured to cause the wireless device to perform a set of operations, or steps, S102-S110, as disclosed above. For example, the storage medium 230 may store the set of operations, and the processing circuitry 210 may be configured to retrieve the set of operations from the storage medium 230 to cause the wireless device to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The wireless device may further comprise a communications interface 220 for communications with a radio access network node 110, 120 (and hence indirectly with the 5GCN 300). As such the communications interface 220 may comprise one or more transmitters and receivers, comprising analogue and digital components.

The processing circuitry 210 controls the general operation of the wireless device e.g. by sending data and control signals to the communications interface 220 and the storage medium 230, by receiving data and reports from the communications interface 220, and by retrieving data and instructions from the storage medium 230. Other components, as well as the related functionality, of the wireless device are omitted in order not to obscure the concepts presented herein.

Figure 11:
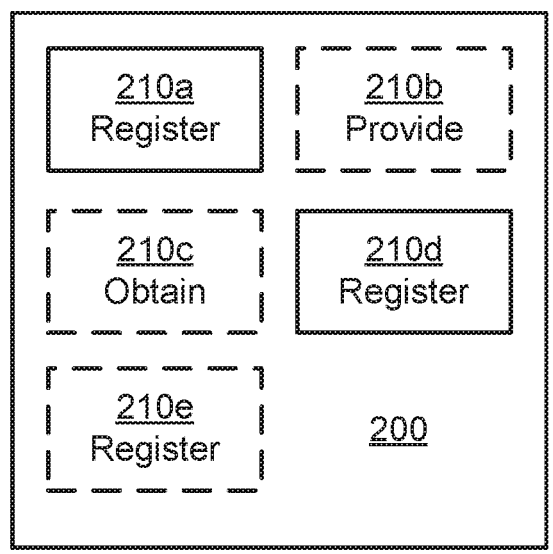
FIG. 11 is a schematic diagram showing functional modules of a wireless device according to an embodiment.

FIG. 11 schematically illustrates, in terms of a number of functional modules, the components of a wireless device according to an embodiment. The wireless device of FIG. 11 comprises a number of functional modules; a first register module 210a configured to perform step S102, and a second register module 210d configured to perform step S108. The wireless device of FIG. 11 may further comprise a number of optional functional modules, such as any of a provide module 210b configured to perform step S104, an obtain module 210C configured to perform step S106, and a third register module 210e configured to perform step S100. In general terms, each functional module 210a-210e may be implemented in hardware or in software. Preferably, one or more or all functional modules 210a-210e may be implemented by the processing circuitry 210, possibly in cooperation with functional units 220 and/or 230. The processing circuitry 210 may thus be arranged to from the storage medium 230 fetch instructions as provided by a functional module 210a-210e and to execute these instructions, thereby performing any steps of the wireless device as disclosed herein.

Figure 12:
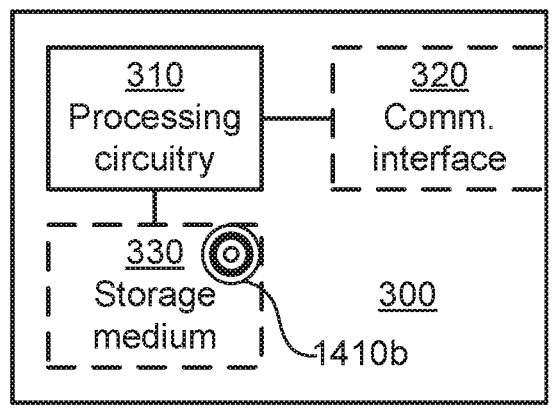
FIG. 12 is a schematic diagram showing functional units of a 5GCN according to an embodiment.

FIG. 12 schematically illustrates, in terms of a number of functional units, the components of a 5GCN 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1410b (as in FIG. 14), e.g. in the form of a storage medium 330. The processing circuitry 310 may further be provided as at least one application specific integrated circuit (ASIC), or field programmable gate array (FPGA).

Particularly, the processing circuitry 310 is configured to cause the 5GCN 300 to perform a set of operations, or steps, S212-S216, as disclosed above. For example, the storage medium 330 may store the set of operations, and the processing circuitry 310 may be configured to retrieve the set of operations from the storage medium 330 to cause the 5GCN 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The 5GCN 300 may further comprise a communications interface 320 for communications with other entities of the communications networks 100, 100', 100'', 100''', and hence indirectly, via a radio access network node 110, 120 with the wireless device 200. As such the communications interface 320 may comprise one or more transmitters and receivers, comprising analogue and digital components.

The processing circuitry 310 controls the general operation of the 5GCN 300 e.g. by sending data and control signals to the communications interface 320 and the storage medium 330, by receiving data and reports from the communications interface 320, and by retrieving data and instructions from the storage medium 330. Other components, as well as the related functionality, of the 5GCN 300 are omitted in order not to obscure the concepts presented herein.

Figure 13:
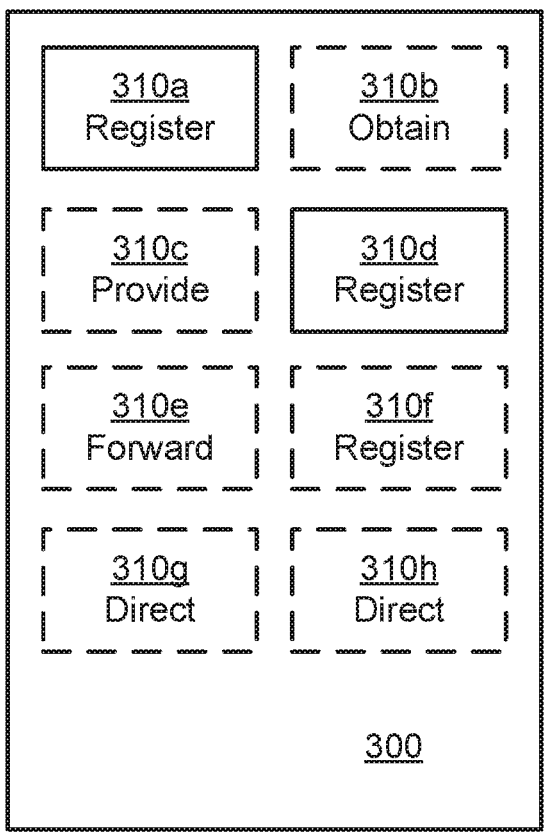
FIG. 13 is a schematic diagram showing functional modules of a 5GCN according to an embodiment.

FIG. 13 schematically illustrates, in terms of a number of functional modules, the components of a 5GCN 300 according to an embodiment. The 5GCN 300 of FIG. 13 comprises a number of functional modules; a first register module 310a configured to perform step S202, and a second register module 310d configured to perform step S208. The 5GCN of FIG. 13 may further comprise a number of optional functional modules, such as any of an obtain module 310b configured to perform step S204, a provide module 310c configured to perform step S206, a forward module 310e configured to perform step S210, a third register module 310f configured to perform step S212, a first direct module 310g configured to perform step S214, and a second direct module 310h configured to perform step S216. In general terms, each functional module 310a-310h may be implemented in hardware or in software. Preferably, one or more or all functional modules 310a-310h may be implemented by the processing circuitry 310, possibly in cooperation with functional units 320 and/or 330. The processing circuitry 310 may thus be arranged to from the storage medium 330 fetch instructions as provided by a functional module 310a-310h and to execute these instructions, thereby performing any steps of the 5GCN 300 as disclosed herein.

The functionality of the 5GCN 300 may be provided in a standalone device or be provided in at least two devices. Thus, a first portion of the instructions performed by the 5GCN 300 may be executed in a first device, and a second portion of the of the instructions performed by the 5GCN 300 may be executed in a second device; the herein disclosed embodiments are not limited to any particular number of devices on which the instructions performed by the 5GCN 300 may be executed. Hence, the methods according to the herein disclosed embodiments are suitable to be performed by 5GCN 300 residing in a cloud computational environment. Therefore, although a single processing circuitry 310 is illustrated in FIG. 12 the processing circuitry 310 may be distributed among a plurality of devices, or nodes. The same applies to the functional modules 310a-310h of FIG. 13 and the computer program 1420b of FIG. 14 (see below).

Figure 14:
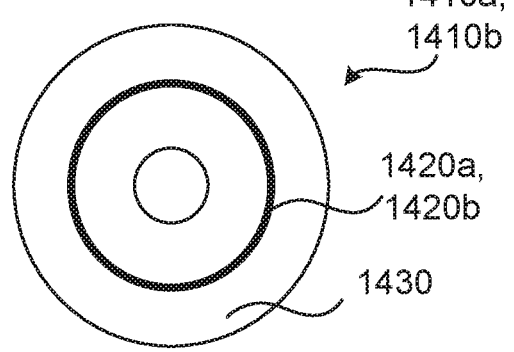
FIG. 14 shows one example of a computer program product comprising computer readable means according to an embodiment.

FIG. 14 shows one example of a computer program product 1410a, 1410b comprising computer readable means 1430. On this computer readable means 1430, a computer program 1420a can be stored, which computer program 1420a can cause the processing circuitry 210 and thereto operatively coupled entities and devices, such as the communications interface 220 and the storage medium 230, to execute methods according to embodiments described herein. The computer program 1420a and/or computer program product 1410a may thus provide means for performing any steps of the wireless device 200 as herein disclosed. On this computer readable means 1430, a computer program 1420b can be stored, which computer program 1420b can cause the processing circuitry 310 and thereto operatively coupled entities and devices, such as the communications interface 320 and the storage medium 330, to execute methods according to embodiments described herein. The computer program 1420b and/or computer program product 1410b may thus provide means for performing any steps of the 5GCN 300 as herein disclosed.

In the example of FIG. 14, the computer program product 1410a, 1410b is illustrated as an optical disc, such as a CD (compact disc) or a DVD (digital versatile disc) or a Blu-Ray disc. The computer program product 1410a, 1410b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1420a, 1420b is here schematically shown as a track on the depicted optical disk, the computer program 1420a, 1420b can be stored in any way which is suitable for the computer program product 1410a, 1410b.

In summary, advantageously these methods, this wireless device, this 5GCN, these computer programs, and this system provide efficient and flexible handling of CS services in a 5G communications network. The handling is flexible in the sense that the provided functionality for supporting the CS service in the 5GCN can be added per subscriber, and hence the functionality does not need to be supported by a dedicated node in a particular area. Advantageously these methods, this wireless device, this 5GCN, these computer programs, and this system relieve the need to support VoLTE in 5GCN for all wireless devices served by the 5GCN. Advantageously these methods, this wireless device, this 5GCN, these computer programs, and this system enable the CS domain to be used for voice and SMS also in a 5G communications system.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for supporting a Circuit Switched (CS) service in a 5G Core Network (5GCN) the method being performed by a wireless device, the method comprising:
   registering with an Access and Mobility Management Function (AMF) of the 5GCN using Non-Access Stratum (NAS) signaling; and
   registering, with the 5GCN and using NAS signaling, for at least one CS service, wherein the registering for the at least one CS service is performed in conjunction with registering with the AMF.

2. The method of claim 1, wherein the registering with the AMF comprises:
   providing an indication to the AMF for support of the at least one CS service.

3. The method of claim 1, further comprising:
   obtaining, from the AMF, an indication that the AMF enables the at least one CS service.

4. The method of claim 1, further comprising:
   completing registration with the at least one CS service with an Inter Working Function (IWF) of the 5GCN.

5. The method of claim 4, wherein the IWF is either a Circuit Switched FallBack (CSFB) IWF or a Short Message Service (SMS) IWF.

6. The method of claim 1, wherein the CS service is a Circuit Switched FallBack (CSFB) voice service or a messaging service.

7. The method of claim 1 wherein the registering for the at least one CS service is performed in parallel with the registration with the AMF.

8. The method of claim 1, wherein the registering for the at least one CS service is performed upon successful registration with the AMF.

9. The method of claim 1, wherein the registering with the AMF is performed during initial network attachment of the wireless device.

10. The method of claim 1, wherein the registering with the AMF is performed during re-attachment of the wireless device to the 5GCN.

11. A method for supporting a Circuit Switched (CS) service in a 5G Core Network (SGCN) the method being performed in the SGCN, the method comprising:
    registering a wireless device with an Access and Mobility Management Function (AMF) of the 5GCN using Non-Access Stratum (NAS) signaling; and
    registering the wireless device for at least one CS service with the 5GCN using NAS signaling in conjunction with registering the wireless device with the AMF.

12. The method of claim 11, wherein the registering with the AMF comprises:
    obtaining an indication from the wireless device for support of the at least one CS service.

13. The method of claim 12, further comprising:
    completing registration of the wireless device with the at least one CS service with an Inter Working Function (IWF) of the 5GCN.

14. The method of claim 13, wherein the IWF is either a Circuit Switched FallBack (CSFB) IWF or a Short Message Service (SMS) IWF.

15. The method of claim 14, further comprising:
    directing indication of establishment of a voice call of a voice service for the wireless device via the CSFB IWF.

16. The method of claim 14, further comprising:
    directing a message of a messaging service for the wireless device via the SMS IWF.

17. The method of claim 14, wherein the 5GCN is configured for network slicing, and wherein availability and/or usage of the CSFB IWF and the SMS IWF is either dependent on or independent from which network slices that the wireless device requests to use.

18. The method of claim 12, further comprising:
    forwarding, from the AMF to an Inter Working Function (IWF) in the 5GCN, signaling for registering the at least one CS service.

19. The method of claim 11, further comprising:
    providing, from the AMF and to the wireless device, an indication that the AMF enables the at least one CS service.

20. The method of claim 11, wherein a common registering is performed for all of the at least one CS service.

21. The method of claim 11, wherein a separate registering is performed for each of the at least one CS service.

22. A wireless device for supporting a Circuit Switched (CS) service in a 5G Core Network (5GCN) the wireless device comprising:
    processing circuitry; and
    a storage medium storing instructions that, when executed by the processing circuitry, cause the wireless device to:
       register with an Access and Mobility Management Function (AMF) of the 5GCN using Non-Access Stratum (NAS) signaling; and
       register, with the 5GCN and using NAS signaling, for at least one CS service, wherein the registering for the at least one CS service is performed in conjunction with registering with the AMF.

23. A 5G Core Network (5GCN) for supporting a Circuit Switched (CS) service in the 5GCN, the 5GCN comprising:
    processing circuitry; and
    a storage medium storing instructions that, when executed by the processing circuitry, cause the 5GCN to:
       register a wireless device with an Access and Mobility Management Function (AMF) of the 5GCN using Non-Access Stratum (NAS) signaling; and
       register the wireless device for at least one CS service with the 5GCN using NAS signaling in conjunction with registering the wireless device with the AMF.

* * * * *

UNITED STATES PATENT AND TRADEMARK OFFICE
CERTIFICATE OF CORRECTION

PATENT NO. : 10,966,269 B2
APPLICATION NO. : 15/325674
DATED : March 30, 2021
INVENTOR(S) : Keller et al.

It is certified that error appears in the above-identified patent and that said Letters Patent is hereby corrected as shown below:

In the Drawings

In Fig. 4, Sheet 2 of 6, delete "CSIWF" and insert -- CSFBIWF --, therefor.

Figure 9:
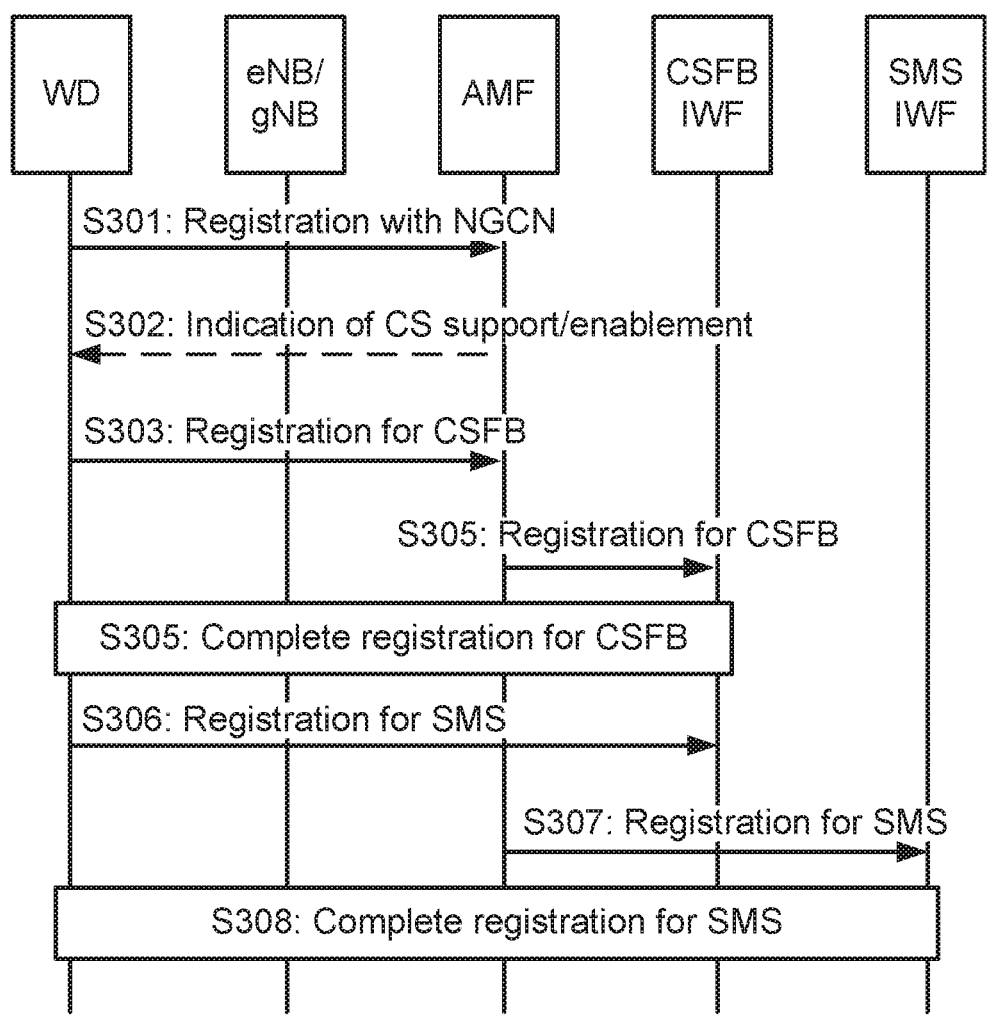
FIG. 9 is a signalling diagram illustrating an exchange of signals according to an embodiment.

In Fig. 9, Sheet 5 of 6, in Step S301, Line 1, delete "NGCN" and insert -- 5GCN --, therefor.

In Fig. 9, Sheet 5 of 6, delete " 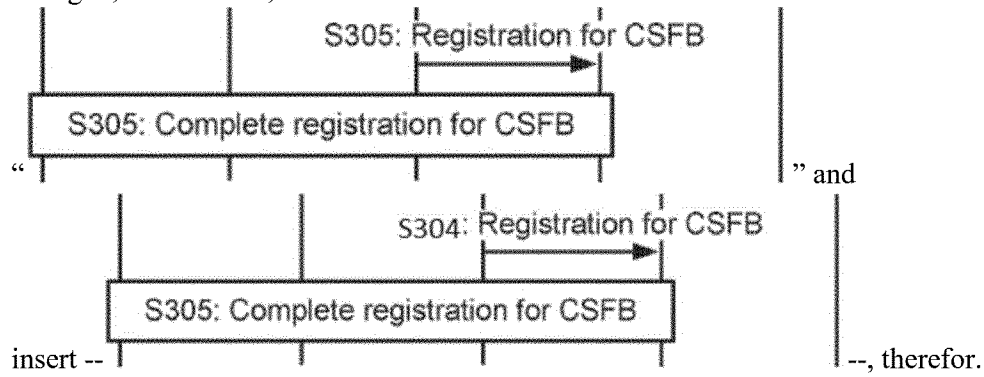 " and insert -- --, therefor.

In the Specification

In Column 1, Lines 21-22, delete "evolved packet Core (EPC)" and insert -- Evolved Packet Core (EPC) --, therefor.

In Column 2, Line 42, delete "supporting a supporting a" and insert -- supporting a --, therefor.

In Column 3, Line 52, delete "sixth seventh, eight," and insert -- sixth, seventh, eighth, --, therefor.

In Column 3, Line 56, delete "eight," and insert -- eighth, --, therefor.

Signed and Sealed this
Twenty-eighth Day of December, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,966,269 B2

In Column 4, Line 9, delete "diagram" and insert -- diagrams --, therefor.

In Column 4, Line 40, delete "or to" and insert -- or --, therefor.

In Column 4, Line 64, delete "NG8, GNG 11." and insert -- NG8, NG11. --, therefor.

In Column 5, Line 30, delete "Ngy," and insert -- NGy, --, therefor.

In Column 6, Line 29, delete "106" and insert -- S106 --, therefor.

In Column 8, Line 41, delete "(IoT)" and insert -- (IoTs) --, therefor.

In Column 9, Line 10, delete "attach" and insert -- attachment --, therefor.

In Column 9, Line 15, delete "Alternative," and insert -- Alternatively, --, therefor.

In Column 9, Lines 17-18, delete "wireless device 300" and insert -- wireless device 200 --, therefor.

In Column 9, Line 58, delete "If" and insert -- if --, therefor.

In Column 10, Line 2, delete "oofr" and insert -- for --, therefor.

In Column 10, Line 14, delete "to schematically" and insert -- schematically --, therefor.

In Column 10, Line 64, delete "210C" and insert -- 210c --, therefor.

In Column 10, Line 65, delete "S100." and insert -- S110. --, therefor.

In Column 12, Line 10, delete "of the of the" and insert -- of the --, therefor.

In the Claims

In Column 13, Line 53, in Claim 11, delete "(SGCN)" and insert -- (5GCN) --, therefor.

In Column 13, Line 54, in Claim 11, delete "SGCN," and insert -- 5GCN, --, therefor.